United States Patent
Otaki et al.

(10) Patent No.: US 7,521,155 B2
(45) Date of Patent: *Apr. 21, 2009

(54) VOLUME HOLOGRAM LAYER AND VOLUME HOLOGRAM TRANSFER FOIL

(75) Inventors: Hiroyuki Otaki, Tokyo (JP); Toshio Yoshihara, Tokyo (JP); Tetsuya Toshine, Kashiwa (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/458,563

(22) Filed: Jun. 10, 2003

(65) Prior Publication Data

US 2004/0253521 A1    Dec. 16, 2004

(51) Int. Cl.
*G03H 1/02* (2006.01)
(52) U.S. Cl. .................. 430/1; 430/2; 359/3
(58) Field of Classification Search .......... 430/1, 430/2, 296, 281.1, 280.1; 522/4; 359/3
See application file for complete search history.

(56) References Cited

U.S. PATENT DOCUMENTS

| | | | |
|---|---|---|---|
| 5,453,340 A | | 9/1995 | Kawabata et al. |
| 5,525,645 A | * | 6/1996 | Ohkawa et al. ........ 522/74 |
| 5,750,590 A | * | 5/1998 | Schaefer et al. ........ 523/115 |
| 5,965,324 A | * | 10/1999 | Okubo et al. ........ 430/281.1 |
| 6,066,378 A | * | 5/2000 | Morii et al. ........ 428/40.2 |
| 6,236,493 B1 | * | 5/2001 | Schmidt et al. ........ 359/296 |
| 6,495,295 B1 | | 12/2002 | Shioda et al. |
| 6,506,468 B1 | | 1/2003 | Morii et al. |
| 6,852,397 B2 | * | 2/2005 | Toshine et al. ........ 428/212 |
| 7,141,336 B2 | * | 11/2006 | Shioda et al. ........ 430/1 |
| 2003/0124436 A1 | * | 7/2003 | Shioda et al. ........ 430/1 |
| 2004/0234816 A1 | * | 11/2004 | Azakami et al. ........ 428/694 B |
| 2005/0191560 A1 | * | 9/2005 | Otaki et al. ........ 430/1 |

FOREIGN PATENT DOCUMENTS

| | | | |
|---|---|---|---|
| EP | 360869 | * | 4/1990 |
| EP | 509512 | * | 10/1992 |
| EP | 831373 | * | 3/1998 |
| EP | 1022625 | * | 7/2000 |
| EP | 1168111 | * | 1/2002 |
| JP | 2000347001 | * | 12/2000 |

* cited by examiner

*Primary Examiner*—Martin J Angebranndt
(74) *Attorney, Agent, or Firm*—Ladas & Parry LLP (57) ABSTRACT

It is a main object of the present invention to provide a volume hologram layer with good foil cutting property which is used for a volume hologram transfer foil and the like. The present invention provides a volume hologram layer wherein when the layer thickness thereof is 20 μm, breaking strength is in a range from 10 MPa to 30 MPa and breaking strain is in a range from 0.1% to 3% at 25° C., and breaking strength is in a range from 0.1 MPa to 1 MPa and breaking strain is in a range from 0.1% to 5% at 130° C., to thereby solve the above problem.

2 Claims, 2 Drawing Sheets

VOLUME HOLOGRAM LAYER AND VOLUME HOLOGRAM TRANSFER FOIL

BACKGROUND OF THE INVENTION

1. Field of the Invention

The present invention relates to a volume hologram layer used for a volume hologram transfer foil and the like and to a volume hologram transfer foil using the volume hologram layer.

2. Description of the Related Art

Holograms are those obtained by allowing two lights (object light and reference light) having the same wavelength to interfere with each other to record the wavefront of object light on a photosensitive material as an interference fringe. When light of the same condition as the original object light is applied to this hologram, a diffraction phenomenon caused by interference light arises, making it possible to reproduce the same wavefront as the original object light. These holograms are classified into several categories (e.g., a surface relief type hologram and volume hologram) by the recording forms of interference fringes caused by the interference of laser light or highly coherent light.

Here, the aforementioned holograms are used a lot in security applications utilizing such characteristics that it is difficult to reproduce the same design. In this application, a surface relief type hologram is generally used in which fine irregularities are formed on the surface of a hologram forming layer to thereby record an interference fringe. However, the recent spread of hologram technologies and advancement in forging techniques have made it possible to copy and reproduce the surface relief type hologram and it has became difficult to use the surface relief type hologram in security applications.

On the other hand, the volume hologram is produced by recording an interference fringe caused by the interference of light, as a fringe differing in refractive index, three dimensionally in the direction of the thickness of a photosensitive material. This volume hologram differs in manufacturing method and also quite different in visual effect from the surface relief type hologram, which is widely used at present, it is easy to determine the authenticity. Also, the volume hologram requires expensive manufacturing facilities and a high grade design techniques to copy a design, it is therefore very difficult to produce a hologram with the intention of forging. For this, the volume holograms in use in security applications are demanded.

Here, in order to make a hologram adhere to an adherend, a transfer foil or the like comprising a base material film, a hologram layer and a heat sensitive adhesive layer is usually used. In this case, the heat sensitive adhesive layer in the hologram transfer foil is brought into contact with the adherend and heat transfer is carried out from the base material film side. At this time, in order to form the hologram layer into the shape to be intended, it is necessary that the cutting property of the hologram layer, namely, foil cutting property is good that the hologram is surely imparted to the adherend. However, because the volume hologram has the features that an interference fringe is recorded in the forming layer, it is necessary to thicken the volume hologram layer to obtain a clear image, resulting in inferior foil cutting property. Also, for mass production of the volume hologram transfer foils, it is necessary to use a photopolymer which can be treated by a dry process. However, because nonreactive plasticizers are usually used to improve refractive index modulation ability, a produced volume hologram is softened, which is accompanied by inferior foil cutting property.

As such a volume hologram, for example, a photosensitive composition for recording a volume hologram with high film strength (see Japanese Patent No. 2873126) and a label for forming a volume hologram laminated body to which a fine particle is added (see Japanese Patent Application Laid-Open (JP-A) No. 10-97173) have been proposed. Also, a hologram transfer foil whose breaking strain is defined has been proposed (see JP-A No. 2000-272295). However, any of these methods have not yet reached a hologram layer which has a clear image, excellent transfer ability and can be mass produced.

SUMMARY OF THE INVENTION

From the above fact, provision of a volume hologram layer having good foil cutting property used, for example, for a volume hologram transfer foil and the like, is desired.

The present invention provides a volume hologram layer wherein, for the volume hologram layer with thickness of 20 μm, breaking strength is in a range from 10 MPa to 30 MPa and breaking strain is in a range from 0.1% to 3% at 25° C., and breaking strength is in a range from 0.1 MPa to 1 MPa and breaking strain is in a range from 0.1% to 5% at 130° C.

According to the present invention, the breaking strengths and breaking strains at 25° C. and 130° C. fall in the above ranges, when the volume hologram layer is used, for example, for a volume hologram transfer foil, good foil cutting property is obtained in a thermal transfer operation and the volume hologram layer may be used in various applications.

In the above invention, a fine particle is preferably comprised. This is because good foil cutting property can be obtained by comprising a fine particle in the above volume hologram layer.

The present invention also provides a volume hologram layer comprising a cationic polymerizable compound, a radical polymerizable compound, a photo-radical polymerization initiator system which polymerizes the radical polymerizable compound, a photo-cationic polymerization initiator system which polymerizes the cationic polymerizable compound and a fine particle having an average particle diameter of 100 nm to 600 nm.

According to the present invention, by comprising the aforementioned cationic polymerizable compound, and the radical polymerizable compound and their polymerization initiator system, the volume hologram layer can be made to be one in which an image is formed. Also, because the above fine particle is comprised, good foil cutting property can be obtained in a thermal transfer process when, for example, the volume hologram layer is used for a volume hologram transfer foil.

In the above invention, the above cationic polymerizable compound is preferably a liquid at normal temperature. This is because the cationic polymerizable compound easily moves in the layer and it is therefore possible to form an image of a volume hologram efficiently when forming the volume hologram on which the image is formed by irradiating laser light or the like.

Also, in the above invention, the aforementioned cationic polymerizable compound is preferably a compound having a polymerizable functional group having three or more functions per molecule. The reason is that high crosslinking density in the volume hologram layer can be obtained and it is therefore possible to obtain a volume hologram layer with a high foil cutting property.

Further, in the above invention, it is preferable that, for the volume hologram layer with thickness of 20 μm, breaking strength is in a range from 10 MPa to 30 MPa and breaking strain is in a range from 0.1% to 3% at 25° C., and breaking strength is in a range from 0.1 MPa to 1 MPa and breaking strain is in a range from 0.1% to 5% at 130° C. This is because when the breaking strengths and breaking strains at 25° C. and 130° C. fall in the above ranges, good foil cutting property is obtained in a thermal transfer operation when the volume hologram layer is used for a volume hologram transfer foil.

In the present invention, the aforementioned fine particle is preferably contained in an amount of 1% by weight to 30% by weight. This is because when the content of the fine particle is less than the above range, it is difficult to obtain good foil cutting property, whereas when the content exceeds the above range, there is the case where strength is lowered when forming a volume hologram layer.

Also, in the present invention, the above fine particle may be a fluorine type fine particle. This is because when the above fine particle is a fluorine type fine particle, good foil cutting property can be developed.

Also, in the present invention, the above fine particle may be a titania fine particle. This is because when the above fine particle is a titania fine particle, good foil cutting property can also be developed.

Also, the present invention provides a volume hologram transfer foil comprising the volume hologram layer according to the above invention, a base material and a heat sensitive adhesive layer, wherein the volume hologram layer is formed on the base material and the heat sensitive adhesive layer is formed on the volume hologram layer.

This is because according to the present invention, a volume hologram transfer foil having good foil cutting property can be obtained because it comprises the above volume hologram layer, and it can be used in various applications.

DESCRIPTION OF THE PREFERRED EMBODIMENT

The present invention relates to a volume hologram layer and to a volume hologram transfer foil using the volume hologram layer. Hereinafter, explanations of each will be given.

A. Volume Hologram Layer

First, the volume hologram layer of the present invention will be explained. The volume hologram layer of the present invention has two embodiments. In a first embodiment, the volume hologram layer is such that when the layer thickness thereof is 20 μm, breaking strength is in a range from 10 MPa to 30 MPa and breaking strain is in a range from 0.1% to 3% at 25° C., and breaking strength is in a range from 0.1 MPa to 1 MPa and breaking strain is in a range from 0.1% to 5% at 130° C. In a second embodiment, the volume hologram layer comprises a cationic polymerizable compound, a radical polymerizable compound, a photo-radical polymerization initiator system which polymerizes the radical polymerizable compound, a photo-cationic polymerization initiator system which polymerizes the cationic polymerizable compound and a fine particle having an average particle diameter of 100 nm to 600 nm.

In either of these embodiments according to the present invention, good foil cutting property can be obtained when a volume hologram layer is formed on an adhered by thermal transfer, in the case of using the volume hologram layer, for example, as a volume hologram transfer foil.

Hereinafter, each embodiment will be explained.

1. First Embodiment

First, the first embodiment of the volume hologram layer of the present invention will be explained. The first embodiment of the volume hologram layer of the present invention is such that the braking strength at 25° C. and the breaking strength and breaking strain at 130° C., of the volume hologram layer having a layer thickness of 20 μm, are within a given range.

This ensures that when using the volume hologram layer for a volume hologram transfer foil, a good foil cutting property can be obtained.

To state the aforementioned breaking strength and breaking strain specifically, the breaking strength is preferably in a range from 10 MPa to 30 MPa and particularly 15 MPa to 30 MPa and the breaking strain is preferably in a range from 0.1% to 3% and particularly 0.1% to 1% at 25° C. Also, the breaking strength is preferably in a range from 0.1 MPa to 1 MPa and particularly 15 MPa to 30 MPa and the breaking strain is preferably in a range from 0.1% to 5% and particularly 0.1% to 1.5% at 130° C.

Here, the aforementioned breaking strength and breaking strain are values measured by using an automatic recording tester (Tensilon Universal Tester INSTRON 5565, manufactured by INSTRON Co., Ltd.) at a tensile speed of 2 mm/min.

Furthermore, the volume hologram layer of this embodiment preferably has a glass transition temperature of 100° C. or more. This is because the volume hologram layer of this embodiment can be made stable even if heat is applied, with the result that the volume hologram layer can be transferred by a heat transfer method or the like.

Here, the volume hologram layer in this embodiment preferably contains a fine particle. This ensures that defects can be formed intentionally in the volume hologram layer and it is therefore possible to impart fragility to the volume hologram layer. This fragility allows making the breaking strength and the breaking strain within the above ranges.

In this embodiment, the above fine particle preferably has an average particle diameter in a range from 100 nm to 600 nm, more preferably in a range from 150 nm to 500 nm, and particularly preferably in a range from 200 nm to 500 nm. This is because when the average particle diameter of the above fine particle is less than the above range, it is difficult to impart fragility to the volume hologram layer, whereas when the average particle diameter of the above fine particle exceeds the above range, there is the case where this has an adverse influence on the volume hologram image formation of the volume hologram layer. In this embodiment, among the above, fine particles having a particle diameter smaller than the wavelength of laser light or the like, used when an image is recorded on the volume hologram layer, are preferable.

Here, the term "average particle diameter" is generally used to show the grain size of a particle and is a value measured by a laser method in this embodiment. The laser method is a method in which a particle is dispersed in a solvent and the scattered light obtained by applying laser rays to the dispersion solvent is converged, followed by calculating to measure average particle diameter, grain size distribution and the like.

Here, the above average particle diameter is a value obtained by measuring using a grain size analyzer Microtrack UPA Model-9230 manufactured by Leeds & Northrup) as a particle diameter measuring instrument by a laser method.

The above fine particle is preferably contained in an amount ranging from 1% by weight to 30% by weight and particularly 5% by weight to 20% by weight in the volume hologram layer. This is because when the amount of the fine particle is less than the above range, the fine particle scarcely contributes to the foil cutting property of the volume hologram layer, whereas when the amount exceeds the above range, it is difficult to keep the strength and transparency of the volume hologram layer.

Here, any fine particle may be used as the above fine particle without limitation as far as it has the above particle diameter. For example, organic fine particles containing, as a resin skeleton, a low density polyethylene, high density polyethylene, polypropylene, (meth)acryl, polyvinyl chloride, polyamide, polyimide, polycarbonate, epoxy or urethane or copolymers of these compounds and inorganic particles such as silica, mica, talc, clay, graphite, calcium carbonate, alumina, aluminum hydroxide, ferrite, china clay, kaolin, titanium dioxide, glass flake, asbestos, agalmatolite powder, quartzite powder, barium sulfate, shelven, chamotte and titania may be used. These fine particles may be used singly or by a mixture of two or more.

Among the above particles, in this embodiment, fluorine type fine particles, which is a fine particle of fluorine containing type resin obtained by substituting a part or all of hydrogens of the skeleton or side chain in the resins of the aforementioned organic fine particles with fluorine atoms, or titania fine particles are preferably used. This reason is that it is possible to improve the foil cutting property of the volume hologram layer.

Also, because fluorine type fine particles which are the fine particles of the aforementioned fluorine containing type resins have a low friction coefficient, they have a small interaction with other components contained in the volume hologram layer and these particles can impart fragility to the volume hologram layer even in a small amount. As the aforementioned fluorine type fine particle, those obtained by fluorinating a part or all of the above exemplified organic fine particles, or those obtained by treating the surface of the fine particles with fluorine containing compound may be used. Particularly, fluorine type fine particles utilizing (meth) acrylate ester compounds are preferably used. Specific examples of such fine particles include monomer polymers using one or more fluorine monomers represented by fluorine containing acrylate esters described in JP-A No. 5-194322, fluorine containing (meth) acrylic compounds described in JP-A No. 9-104655, and fluorine-containing polyfunctional (meth) acrylate ester compounds described in JP-A No. 2001-72646, or monomer copolymers obtained by copolymerizing with other compound having at least one ethylenic unsaturated bond in one molecule containing no fluorine, fluorine containing resin complex fine particle described in JP-A No. 6-73137, and fluorine containing (meth)acrylate ester copolymers described in JP-A No. 5-194668. These fluorine type fine particles may be used singly or by mixing two or more.

Also, as the titania fine particle to be used in this embodiment, among titanium dioxides, for example, rutile type titania fine particles, which prevents the hologram layer from being deteriorated with age by a photocatalystic action, are used. Also, as a method of improving foil cutting property, surface treatments using a silane coupling agent containing a fluorinated alkyl, or surface treatments by metal oxides such as alumina or silica, are effective. Specifically, R-820, R-830, R-930, R-550, R-630, R-680, CR-80, CR-90, CR-95 and CR-60 manufactured by Ishihara Sangyo Co., Ltd. can be listed.

Here, as materials used for the volume hologram layer of this embodiment, materials which are used for usual volume hologram layers may be used. For example, the same materials that are used in the second embodiment as will be explained later may be used and explanations of these materials are therefore omitted here.

2. Second Embodiment

Next, a second embodiment of the volume hologram layer of the present invention will be explained. The second embodiment of the hologram layer of the present invention comprises a cationic polymerizable compound, a radical polymerizable compound, a photo-radical polymerization initiator system which polymerizes the above radical polymerizable compound, a photo-cationic polymerization initiator system which polymerizes the above cationic polymerizable compound and a fine particle having an average particle diameter of 100 nm to 600 nm.

According to this embodiment, by comprising the above cationic polymerizable compound, the above radical polymerizable compound, and their polymerization initiator system, the volume hologram layer can be made to be one in which an image is formed. Also, because the fine particle having an average particle diameter of the predetermined range is contained, good foil cutting property can be obtained when the volume hologram layer is used for a volume hologram transfer foil or the like.

To state the aforementioned breaking strength and breaking strain specifically, the breaking strength is preferably in a range from 10 MPa to 30 MPa and particularly from 15 MPa to 30 MPa, and the breaking strain is preferably in a range from 0.1% to 3% and particularly in a range from 0.1% to 1% at 25° C. Also, the breaking strength is preferably in a range from 0.1 MPa to 1 MPa and particularly from 15 MPa to 30 MPa, and the breaking strain is preferably in a range from 0.1% to 5% and particularly in a range from 0.1% to 1.5% at 130° C. Here, the breaking strength and the breaking strain are values measured by the aforementioned method.

Also, the volume hologram layer of this embodiment preferably has a glass transition temperature of 100° C. or more. This is because the volume hologram layer of this embodiment can be kept stable even if heat is applied thereto, and the volume hologram layer can be transferred by, for example, a thermal transfer method.

Hereinafter, each structure of the volume hologram layer of this embodiment will be explained. The fine particle used in this embodiment is the same as that used in the aforementioned first embodiment, therefore, explanations are omitted here.

(1) Cationic Polymerizable Compound

First, the cationic polymerizable compound used in this embodiment will be explained. The cationic polymerizable compound used in this embodiment is a compound which is cationic polymerized by energy irradiation, by a Bronsted acid or Lewis acid generated from the decomposition of a photo-cationic polymerization initiator system which will be explained later.

Here, the volume hologram layer is formed as follows: for example, a laser is irradiated, in the shape of an image to be intended, to polymerize a radical polymerizable compound which will be explained later, and then energy is irradiated to the entire surface to polymerize uncured materials such as a cationic polymerizable compound. It is to be noted that the wavelength of the laser or the like used when forming an image usually differs from that of the energy irradiated to the entire surface, and the cationic polymerizable compound used in this embodiment is preferably a compound which is not polymerized by, for example, a laser used for forming an image.

Also, in this embodiment, such a cationic polymerizable compound is preferably a liquid at normal temperature from the point that the polymerization of the aforementioned radical polymerizable compound is preferably carried out in a composition having a relatively low viscosity. Examples of such a cationic polymerizable compound include compounds such as those described in, for example, "Chemtec. Oct." J. V. Crivello, page 624 (1980), JP-A No. 62-149784, and Journal of Japanese Association of Adhesives [vol. 26, No. 5, pp 179-187 (1990).

Specific examples include diglycerol polyglycidyl ether, pentaerythritol polyglycidyl ether, 1,4-bis(2,3-epoxypropoxyperfluoroisopropyl)cyclohexane, sorbitol polyglycidyl ether, trimethylolpropane polyglycidyl ether, resorcin diglycidyl ether, 1,6-hexanediol diglycidyl ether, polyethylene glycol diglycidyl ether, phenyl glycidyl ether, paratertiarybutylphenyl glycidyl ether, diglycidyl adipate, diglycidyl orthophthalate, dibromophenyl glycidyl ether, dibromoneopentyl glycol diglycidyl ether, 1,2,7,8-diepoxyoctane, 1,6-dimethylolperfluorohexane diglycidyl ether, 4,4'-bis(2,3-epoxypropoxyperfluoroisopropyl)diphenyl ether, 3,4-epoxycyclohexylmethyl-3',4'-epoxycyclohexane carboxylate, 3,4-epoxycyclohexyloxirane, 1,2,5,6-diepoxy-4,7-methanoperhydroindene, 2-(3,4-epoxycyclohexyl)-3',4'-epoxy-1,3-dioxane-5-spirocyclohexane, 1,2-ethylenedioxy-bis(3,4-epoxycyclohexylmethane), 4',5'-epoxy-2'-methylcyclohexylmethyl-4,5-epoxy-2-methylcyclohexane carboxylate, ethylene glycol-bis(3,4-epoxycyclohexanecarboxylate), bis-(3,4-epoxycyclohexylmethyl)adipate, di-2,3-epoxycyclopentyl ether, vinyl-2-chloroethyl ether, vinyl-n-butyl ether, triethylene glycol divinyl ether, 1,4-cyclohexanedimethanol divinyl ether, trimethyloletanetrivinyl ether, vinyl glycidyl ether and compounds represented by the following formulae.

(In the formula, n denotes an integer from 1 to 5.) and (In the formula, m denotes an integer of 3 or 4, R represents an ethyl or hydroxymethyl group, and n has the same meaning as above.)

Also, in this embodiment, among the aforementioned compounds, it is preferable to use a cationic polymerizable compound having polymerizable functional group of three or more functions per molecule as the cationic polymerizable compound. This is because the foil cutting property of the volume hologram layer can be improved because high crosslinking density in the volume hologram layer can be obtained. These cationic polymerizable compounds may be used either singly or in combinations of two or more.

Here, in this embodiment, the above cationic polymerizable compound is preferably used in an amount in a range from 1% by weight to 60% by weight and particularly 20% by weight to 50% by weight.

(2) Radical Polymerizable Compound

Next, the radical polymerizable compound used in this embodiment will be explained. The radical polymerizable compound used in this embodiment is not limited as far as it is a compound polymerized by the action of an active radical generated from a photo-radical polymerization initiator system, which will be explained later, by, for example, laser irradiation when forming the volume hologram layer. In this embodiment, compounds having at least one ethylenic unsaturated double bond in a molecule are preferable.

Here, the volume hologram layer is those forming an interference fringe by polymerizing a radical polymerizable compound by laser light or highly coherent light to thereby form an image. Accordingly, a radical polymerizable compound and a cationic polymerizable compound which differ from each other in refractive index are selected and used wherein either of these compounds may have a larger refractive index than the other. In this embodiment, particularly from the viewpoint of the selection of materials, it is desirable that the average refractive index of the radical polymerizable compound is larger than that of the above cationic polymerizable compound, specifically, it is desirable that the average refractive index of the radical polymerizable compound is larger by 0.02 or more. This is because when the difference in average refractive index between the radical polymerizable compound and the above cationic polymerizable compound is less than the above value, the refractive index modulation becomes insufficient and it is therefore difficult to form a highly precise image. The average refractive index meant here is an average value of refractive indexes measured for the polymers obtained by polymerizing the cationic polymerizable compound or radical polymerizable compound. Also, the refractive index in this embodiment is a value measured by an Abbe's refractmeter.

Examples of the radical polymerizable compound used in this embodiment include methylmethacrylate, hydroxyethylmethacrylate, laurylacrylate, N-acryloylmorpholine, 2-ethylhexylcarbitolacrylate, isobornylacrylate, methoxypropylene glycol acrylate, 1,6-hexanedioldiacrylate, tetraethylene glycol diacrylate, trimethylolpropanetriacrylate, pentaerythritol triacrylate, pentaerythritol tetraacrylate, acrylamide, methacrylamide, styrene, 2-bromostyrene, phenylacrylate, 2-phenoxyethylacrylate, 2,3-naphthalenedicarboxylic acid (acryloxyethyl) monoester, methylphenoxyethylacrylate, nonylphenoxyethylacrylate, β-acryloxyethylhydrogen phthalate, phenoxypolyethylene glycol acrylate, 2,4,6-tribromophenylacrylate, diphenic acid (2-methacryloxyethyl) monoester, benzylacrylate, 2,3-dibrompropylacrylate, 2-hydroxy-3-phenoxypropylacrylate, 2-naphthylacrylate, N-vinylcarbazole, 2-(9-carbazolyl)ethylacrylate, triphenylmethylthioacrylate, 2-(tricyclo[5,2,10$^{2.6}$]dibromodecylthio)ethylacrylate, S-(1-naphthylmethyl)thioacrylate, dicyclopentanylacrylate, methylenebisacrylamide, polyethylene glycol diacrylate, trimethylolpropanetriacrylate, pentaerythritol triacrylate, diphenic acid (2-acryloxyethyl)(3-acryloxypropyl-2-hydroxy)diester, 2,3-naphthalinedicarboxylic acid (2-acryloxyethyl)(3-acryloxypropyl-2-hydroxy)diester, 4,5-phenanthrenedicarboxylic acid (2-acryloxyethyl) (3-acryloxypropyl-2-hydroxy) diester, dibromneopentyl glycol diacrylate, dipentaerythritol hexaacrylate, 1,3-bis[2-acryloxy-3-(2,4,6-tribromophenoxy)propoxy]benzene, diethylenedithio glycol diacrylate, 2,2-bis(4-acryloxyethoxyphenyl)propane, bis(4-acryloxydiethoxyphenyl)methane, bis(4-acryloxyethoxy-3,5-dibromophenyl)methane, 2,2-bis(4-acryloxyethoxyphenyl)propane, 2,2-bis(4-acryloxydiethoxyphenyl)propane, 2,2-bis(4-acryloxyethoxy-3,5-dibromophenyl)propane, bis (4-acryloxyethoxyphenyl)sulfone, bis(4-acryloxydiethoxyphenyl)sulfone, bis(4-acryloxypropoxyphenyl)sulfone, bis (4-acryloxyethoxy-3,5-dibromophenyl)sulfone, compounds obtained by substituting the acrylates in the aforementioned compounds with methacrylates and further, ethylenic unsaturated double bond-containing compounds containing at least 2 or more S atoms in a molecule which are described in JP-A No. 2-247205 or JP-A No. 2-261808. These compounds may be used either singly or by mixing two or more.

Here, in this embodiment, such a radical polymerizable compound may be used in an amount of 1% by weight to 60% by weight and particularly 20% by weight to 50% by weight.

(3) Photo-radical Polymerization Initiator System

Next, explanations will be given as to the photo-radical polymerization initiator system used in the present embodiment. Any initiator may be used as the photo-radical polymerization initiator system used in this embodiment without limitation as far as it can produce an active radical by, for example, irradiating a laser and can polymerize the aforementioned radical polymerizable compound when forming the volume hologram layer. Examples of the initiator systems include initiator systems described in, for example, U.S. Pat. Nos. 4,766,055, 4,868,092 and 4,965,171, JP-A No. 54-151024, No. 58-15,503, No. 58-29,803, No. 59-189,340, No. 60-76735, and No. 1-28715, Japanese Patent Application No. 3-5569, and "PROCEEDINGS OF CONFERENCE ON RADIATION CURING ASIA" (P. 461-477, 1988).

Here, the initiator system means that a sensitizer, which is generally a light absorbing component, can be used in a combination with an active radical generating compound or an acid generating compound. As the sensitizer in such a photo-radical polymerization initiator system, color compounds such as dyes are frequently used in order to absorb visible laser light. As the sensitizer in the case where non-colored transparency is demanded to a final hologram (for example, in the case of using as a head-up display for cars and the like), cyanine type dyes as described in JP-A No. 58-29803, JP-A No. 1-287105, and JP-A No. 3-5569 are preferably used. This is because these cyanine type dyes tend to be decomposed by light in general, therefore, the dye in the hologram is decomposed by post-exposure or by allowing these dyes to stand under room light or sun light for several hours to several days, so that these dyes have no absorption in the visible region, whereby a non-colored transparent volume hologram can be obtained. Specific examples of the cyanine type dye include anhydro-3,3'-dicarboxymethyl-9-ethyl-2, 2'thiacarbocyaninebetaine, anhydro-3-carboxymethyl-3',9-diethyl-2,2'thiacarbocyaninebetaine, 3,3',9-triethyl-2,2'-thiacarboxycyanine iodide, 3,9-diethyl-3'-carboxymethyl-2,2'-thiacarboxycyamine iodide, 3,3',9-triethyl-2,2'-(4,5,4',5'-dibenzo) thiacarbocyanine-iodide, 2-[3-(3-ethyl-2-benzothiazolidene)-1-propenyl]-6-[2-(3-ethyl-2-benzothiazolidene)ethylideneimino]-3-ethyl-1,3,5-thiadiazolium.iodide, 2-[[3-allyl-4-oxo-5-(3-n-propyl-5,6-dimethyl-2-benzothiazolilidene)-ethylidene-2-thiazolinilidene]methyl]3-ethyl-4,5-diphenylthiazolinium.iodide, 1,1',3,3,3',3'-hexamethyl-2,2'-indotricarbocyanine.iodide, 3,3'-diethyl-2,2'-thiatricarbocyanine.perchlorate, anhydro-1-ethyl-4-methoxy-3'-carboxymethyl-5'-chloro-2,2'-quinothiacyaninebetaine, anhydro-5,5'-diphenyl-9-ethyl-3, 3'-disulfopropyloxacarbocyaninhydroxide.triethylamine salt and 2-[3-(3-ethyl-2-benzothiazolidene)-1-propenyl]-6-[2-(3-ethyl-2-benzothiazolidene)ethylideneimino]-3-ethyl-1,3, 5-thiadiazolium-iodide. These compounds may be used either singly or in combinations of two or more.

Examples of the active radical generating compound which may be used in combination with the cyanine type dye include diallyliodonium salts as described in the above JP-A No. 58-29803, JP-A No. 1-287105, and JP-A No. 3-5569, or 2,4,6-substituted-1,3,5-triazines. When high light sensitivity is required, diallyliodonium salts are particularly preferably used. Specific examples of the above diallyliodonium salts include chlorides, bromides, tetrafluoroborates, hexafluorophosphates, hexafluoroarsenates, hexafluoroantimonates and trifluoromethanesulfonates such as diphenyliodonium, 4,4'-dichlorodiphenyliodonium, 4,4'-dimethoxydiphenyliodonium, 4,4'-ditertiarybutyldiphenyliodonium, 3,3'-dinitrodiphenyliodonium. Also, specific examples of the 2,4,6-substituted-1,3,5-triazines include 2-methyl-4,6-bis(trichloromethyl)-1,3,5-triazine, 2,4,6-tris(trichloromethyl)-1,3,5-triazine, 2-phenyl-4,6-bis(trichloromethyl)-1,3,5-triazine, 2,4-bis(trichloromethyl)-6-(p-methoxyphenylvinyl)-1,3,5-triazine and 2-(4'-methoxy-1'-naphthyl)-4,6-bis(trichloromethyl)-1,3,5-triazine.

Here, such a photo-radical polymerization initiator system is used in an amount of 0.3% by weight to 15% by weight and particularly 1% by weight to 10% by weight.

(4) Photo-cationic Polymerization Initiator System

Next, the photo-cationic polymerization initiator system used in this embodiment will be explained. As the photo-cationic polymerization initiator system used in this embodiment, any material may be used without any particular limitation as far as it generates a Bronsted acid or Lewis acid by energy irradiation to polymerize the aforementioned cationic polymerizable compound. However, those inert to, for example, a laser and highly coherent light particularly which polymerize the aforementioned radical polymerizable compound but are sensitive to the energy irradiated afterward on the entire surface, are preferable. This is because when the radical polymerizable compound is polymerized, the cationic polymerizable compound are allowed to exist as it is in a scarcely reacted state, so that a large refractive index modulation in the volume hologram layer can be obtained.

Here, the photo-cationic polymerization initiator system less sensitive to laser light and highly coherent light may be regarded as those when carrying out thermal analysis under the following conditions, the maximum value of the DSC value caused by photopolymerization initiated by the photo-cationic polymerization initiator system is 500 mW or less (including 0 mW) per 1 mg of a sample to be measured.

Measuring Conditions

Measuring device: A differential scanning calorimeter DSC220 and a light source device UV-1 are used in an SSC5200H thermal analyzing system manufactured by Seiko Instruments Inc.

Measuring sample: Prepared by dissolving an object photo-cationic polymerization initiator system in an amount of 3% by weight in UVR-6110 (cationic polymerizable compound) manufactured by Union Carbide (after dissolving by adding an organic solvent, the solvent may be evaporated).

Irradiation light: Light regulated to the same level as laser light or highly coherent light by using an interference filter (half value width: about 10 nm) was irradiated at an intensity of 200 mJ/cm$^2$.

Examples of such a photo-cationic polymerization initiator system include those described in "UV Curing: Science and Technology", pp 23-76, edited by S. Peter Pappas, a Technology Marketing Publication and "Coments Inorg. Chem.", B. Klingert, M. Riediker and A. Roloff, Vol 7, No. 3, pp 109-138 (1988). These compounds may be used either singly or in combinations of two or more.

Preferable examples of the diallyliodonium salts among the aforementioned examples include tetrafluoroborates, hexafluorophsphates, hexafluoroarsenates, hexafluoroantimonates, trifluoromethanesulfonates and 9,10-dimethoxyanthracenesulfonates which are iodoniums shown in the case of the aforementioned photo-radical polymerization initiator systems. Preferable examples of the triallylsulfonium salts include tetrafluoroborates of sulfoniums such as triphenylsulfonium, 4-tertiarybutyltriphenylsulfonium, tris(4-methylphenyl) sulfonium, tris(4-methoxyphenyl)sulfonium and 4-thiophenyltriphenylsulfonium, hexafluorophsphates, hexafluoroarsenates,and hexafluoroantimonates, trifluoromethanesulfonates and 9,10-dimethoxyanthracene-2-sulfonates.

Here, such a photo-cationic polymerization initiator system is used in an amount of 0.3% by weight to 15% by weight and particularly 1% by weight to 10% by weight.

(5) Others

Also, the volume hologram layer may contain, besides the aforementioned components, additives, for example, a thermopolymerization inhibitor, silane coupling agent, plasticizer, colorant and high molecular weight binder according to the need.

In this embodiment, a high molecular weight binder is particularly preferably contained. This high molecular weight binder makes it possible to form an even volume hologram layer and also to keep an image formed by the polymerization of the aforementioned radical polymerizable compound.

As such a high molecular weight binder, those which are highly compatible with the aforementioned radical polymerizable compound and cationic polymerizable compound are used. Examples of the high molecular weight binder include copolymers of chlorinated polyethylene, polymethylmethacrylate or methylmethacrylate and other alkyl (meth)acrylates, copolymers of vinyl chloride and acrylonitrile, and polymers having a cationic polymerizable group at the side chain or principal chain such as polyvinyl acetate, polyvinyl alcohol, polyvinyl formal, polyvinylbutyral, polyvinylpyrrolidone, ethyl cellulose or acetyl cellulose. These compounds may be used either singly or in combinations of two or more.

Such a high molecular weight binder is used in an amount of usually 20% by weight to 50% by weight and particularly 30% by weight to 40% by weight.

(6) Volume Hologram Layer

Next, the volume hologram layer of this embodiment will be explained. The volume hologram layer of this embodiment is not particularly limited as far as the layer comprises the aforementioned cationic polymerizable compound, radical polymerizable compound, photo-radical polymerization initiator system, photo-cationic polymerization initiator system and fine particle.

In the formation of such a volume hologram layer, first a composition prepared by mixing the aforementioned each component is coated on, for example, a subject base material by using a usual coating means, for example, a spin coater, gravure coater, comma coater or bar coater and dried according to the need. Also, the volume hologram layer may be formed by injecting the above composition between two base materials such as glass plates.

Also, when coating the above materials, a solvent may be used according to the need. Examples of this solvent include ketone type solvents such as methyl ethyl ketone, acetone and cyclohexanone, ester type solvents such as ethyl acetate, butyl acetate and ethylene glycol diacetate, aromatic solvents such as toluene and xylene, cellosolve type solvents such as methyl cellosolve, ethyl cellosolve and butyl cellosolve, alcohol type solvents such as methanol, ethanol and propanol, ether type solvents such as tetrahydrofuran and dioxane and halogen type solvents such as dichloromethane and chloroform.

Next, the layer coated with the above composition is exposed to laser light or highly coherent light (e.g., light having a wavelength of 300 nm to 1200 nm) which is generally used in a holography exposure apparatus to polymerize the aforementioned radical polymerizable compound, thereby recording the interference fringe of an image to be intended. In succession, the cationic polymerizable compound remaining unreacted is cured by irradiating the entire surface, coated with the above composition, with light (e.g., light of 200 nm to 700 nm) to which the aforementioned photo-cationic polymerization initiator system is sensitive, thereby forming the volume hologram layer of the present embodiment. At this time, the radical polymerizable compound left unreacted may be cured simultaneously. Also, after the above image is formed, treatments using infrared rays or heat may be carried out before energy is irradiated to the entire surface, to thereby vary, for example, diffraction efficiency, the peak wavelength of the diffracted light, and half band width of diffraction light.

The amount of the aforementioned composition to be coated is usually made to be in a range from 1 $g/m^2$ to 50 $g/m^2$ and the film thickness of the volume hologram layer is usually in a range from 0.1 μm to 50 μm and particularly from 1 μm to 20 μm though appropriately selected according to the use and type of the volume hologram layer.

B. Volume Hologram Transfer Foil

Next, the volume hologram transfer foil of the present invention will be explained. The volume hologram transfer foil of the present invention comprises the aforementioned volume hologram layer, a base material and a heat sensitive adhesive layer, wherein the hologram layer is formed on the base material and the heat sensitive adhesive layer is formed on the hologram layer.

Figure 1:
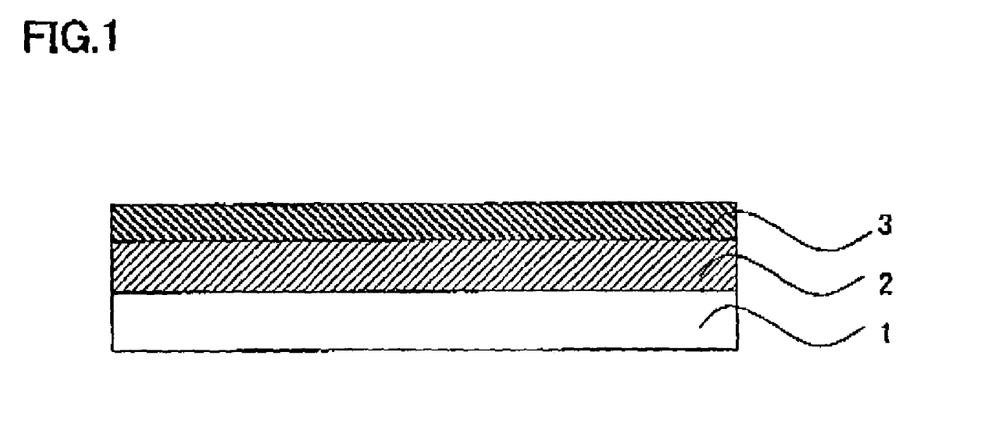
FIG. 1 is a schematic sectional view showing one example of a volume hologram transfer foil in the present invention.

The volume hologram transfer foil of the present invention comprises, as shown, for example, in FIG. 1, a base material 1, a hologram layer 2 formed on the base material 1 and a heat sensitive adhesive layer 3 formed on the hologram layer 2.

In the volume hologram transfer foil of the present invention, the volume hologram layer can be adhered with the adherend, by the heat sensitive adhesive, by allowing the above heat sensitive adhesive and an adherend contact to each other, and heating from the base material side, so that the volume hologram layer can be transferred onto the adherend. According to the present invention, because the volume hologram transfer foil comprises the aforementioned volume hologram layer having the high foil cutting property, only the intended part of the volume hologram layer can be transferred to the adherend, making it possible to form a volume hologram transfer foil which may be used in various applications.

Figure 2:
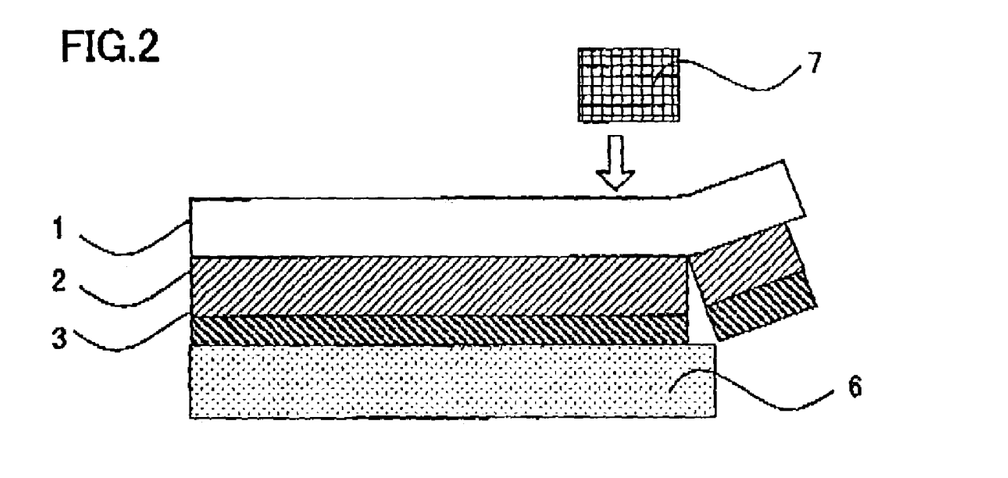
FIG. 2 is a schematic sectional view showing one example of a transfer of a volume hologram transfer foil in the present invention.

Such a transfer operation may be carried out, as shown in, for example, in FIG. 2, by laminating the above heat sensitive adhesive layer 3 on the surface of the adherend 6, on which the volume hologram is transferred, such that they contact with each other, and by heating the part, to which the volume hologram is to be transferred, under pressure using, for example, a metal mold 7 which can be heated to melt and to adhere the heat sensitive adhesive layer 3, followed by delaminating off the base material 1.

Hereinafter, each structure of the volume hologram transfer foil of the present invention will be explained. Incidentally, the volume hologram layer is the same as in the case of the aforementioned volume hologram transfer foil and therefore explanations as to the volume hologram layer are omitted here.

1. Base Material

First, explanations of the base material used in the volume hologram transfer foil of the present invention will be given. The base material used in the present invention is which the hologram layer is formed thereon. When transferring the volume hologram layer to an adherend, thermal transfer is carried out from this base material side. Therefore, it is not particularly limited as far as it allows the hologram layer to be formed, and has a resistance to the heat and pressure to be applied during thermal transfer. For example, a PET film, polyvinyl chloride (PVC) film, polyvinylidene chloride film, polyethylene film, polypropylene film, polycarbonate film, cellophane film, acetate film, nylon film, polyvinyl alcohol film, polyamide film, polyamideimide film, ethylene/vinyl alcohol copolymer film, polymethylmethacrylate (PMMA) film, polyether sulfone film and polyether ether ketone (PEEK) film my be used. The thickness of such a base material is usually in a range from 5 μm to 200 μm and preferably in a rage from 10 82 m to 50 μm though it is appropriately selected according to the use and type of the volume hologram transfer foil.

2. Heat Sensitive Adhesive Layer

Next, the heat sensitive adhesive layer used in the present invention will be explained. The heat sensitive adhesive layer used in the present invention is a layer which is formed on the surface opposite to the base material of the volume hologram transfer foil, and is a layer which adheres the volume hologram layer with an adherend, by allowing the both to be close contact with each other and heating or the like, when transferring the volume hologram layer onto the adherend by thermal transfer.

For such a heat sensitive adhesive layer, thermoplastic resins may be used such as an ethylene/vinyl acetate copolymer resin (EVA), polyamide resin, polyester resin, polyethylene resin, ethylene/isobutylacrylate copolymer resin, butyral resin, polyvinyl acetate and its copolymer resin, cellulose type resin, polymethylmethacrylate resin, polyvinyl ether type resin, polyurethane resin, polycarbonate resin, polypropylene resin, epoxy resin, phenol resin, styrene-butadiene-styrene block copolymer (SBS), styrene-isoprene-styrene block copolymer (SIS), styrene-ethylene-butylene-styrene block copolymer (SEBS) and styrene-ethylene-propylene-styrene block copolymer (SEPS). Among the above, layers which can be heat-sealed at temperatures of 180° C. or less are preferable. Further, ethylene/vinyl acetate copolymer resins (EVA) having an acetic acid content of 25% or more are preferably used. Also, the heat sensitive adhesive layer may be colored by the above resins according to the need.

3. Volume Hologram Transfer Foil

Figure 3:
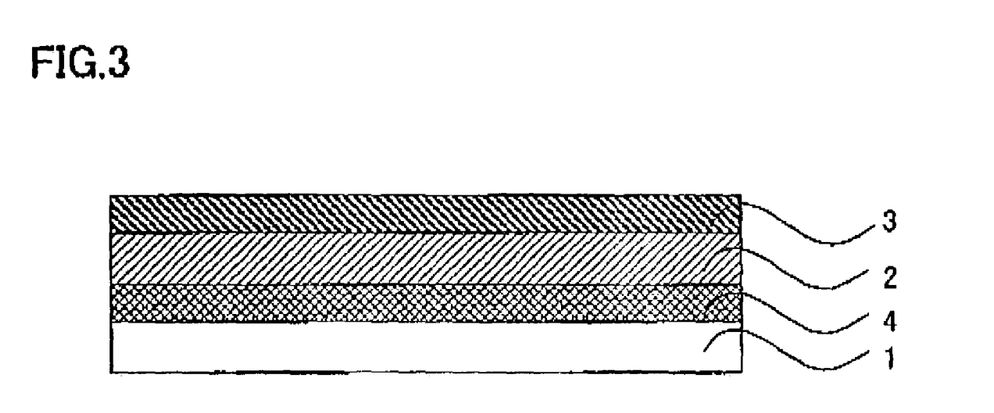
FIG. 3 is a schematic sectional view showing another example of a volume hologram transfer foil in the present invention.
Figure 4:
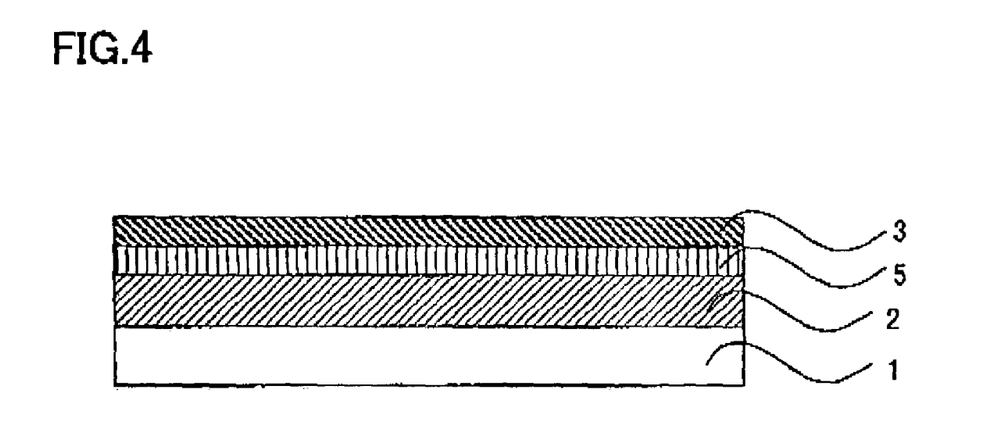
FIG. 4 is a schematic sectional view showing a further example of a volume hologram transfer foil in the present invention.

Next, the volume hologram transfer foil of the present invention will be explained. In the volume hologram transfer foil of the present invention, its structure and the like is not particularly limited as far as it comprises the aforementioned hologram layer, base material, and heat sensitive adhesive layer, wherein the hologram layer is formed on the base material and the heat sensitive adhesive layer is formed on the hologram layer. The volume hologram transfer foil may further comprise other layers besides the above layers. For example, the volume hologram transfer foil may comprise a base material 1, a delaminating layer 4 formed on the base material 1, a hologram layer 2 formed on the delaminating layer 4, and a heat sensitive adhesive layer 3 formed on the hologram layer 2 as shown in FIG. 3. Also, the volume hologram transfer foil may comprise a base material 1, a hologram layer 2 formed on the base material 1, a reflecting layer 5 formed on the hologram layer 2 and a heat sensitive adhesive layer 3 formed on the reflecting layer 5 as shown in FIG. 4.

The above delaminating layer is a layer which makes it possible to delaminate the base material from the volume hologram layer easily when transferring the volume hologram layer onto an adherend by using the volume hologram transfer foil. For example, one compound or a mixture of two or more compounds selected from acryl type resins, vinyl chloride/vinyl acetate copolymer resins, polyester resins, polymethacrylate ester resins, polyvinyl chloride resins, cellulose resins, silicone resins, rubber chlorides, casein, various surfactants and metal oxides may be used. It is particularly preferable that the delaminating layer is constituted of a composition comprising an acryl type resin having a molecular weight of about 20000 to 100000 singly, or an acryl type resin and a vinyl chloride/vinyl acetate copolymer resin having a molecular weight of 8000 to 20000, and further comprising 1 to 5% by weight of a polyester resin having a molecular weight of 1000 to 5000 as an additive.

Also, particularly in the present invention, the delaminating layer is preferably formed such that the delaminating force between the base material and the volume hologram layer is 1 to 5 g/in. (90° peeling). Also, the thickness is preferably in a range from 0.1 μm to 2 μm from the viewpoint of delaminating force and foil cutting property.

Also, with regard to the reflecting layer, it is formed in between the above heat sensitive adhesive layer and the volume hologram layer. If a material, such as a metal thin film, which reflects light, is used as this reflecting layer, non-transparent type volume hologram is obtained. If a transparent material of different refractive index from the hologram layer is used, a transparent type volume hologram is obtained. Either of these types may be used in the present invention. Such a reflecting layer may be formed by using known methods such as sublimation, vacuum deposition, sputtering, reactive sputtering, ion plating and electroplating.

Also, examples of the metal thin film forming the non-transparent type hologram include thin films formed by using metals such as Cr, Ti, Fe, Co, Ni, Cu, Ag, Au, Ge, Al, Mg, Sb, Pb, Pd, Cd, Bi, Sn, Se, In, Ga and Rb, their oxides or nitrides, singly or in combinations of two or more. Among the aforementioned metal thin films, thin films of Al, Cr, Ni, Ag, Au or the like are particularly preferable. The thickness of the thin film is preferably in a range from 1 to 10,000 nm and particularly 20 to 200 nm.

In the meantime, any material may be used as the thin film forming a transparent type hologram as far as it has light transmittance and develops a hologram effect. Examples of such material include transparent materials of a different refractive index from the resin of the hologram forming layer (photocuring resin layer). Although the refractive index of the thin film in this case may be larger or smaller than that of the resin of the hologram forming layer, the difference in refractive index is preferably 0.1 or more, more preferably 0.5 or more and most preferably 1.0 or more. Also, besides the above, a metal reflecting films having a thickness of 20 nm or less can be listed. Examples of materials preferably used for a transparent type reflecting layer include titanium oxide (TiO$_2$), zinc sulfide (ZnS) and Cu/Al complex metal oxides.

Moreover, in the present invention, a barrier layer may be provided at either or both of the positions between the delaminating layer and the volume hologram layer and between the volume hologram layer and the heat sensitive adhesive layer. Depending on the combinations of photosensitive materials, delaminating layer and heat sensitive adhesive layer used in the production means of the present invention, there is a case where low molecular weight components moves with time from the volume hologram layer to other layers, which causes the peak wavelength of the recorded hologram to shift to the blue side (short wavelength side) and the delaminating property of the delaminating layer is changed when these low molecular weight components moves to the delaminating layer or the like. The provision of the barrier layer as aforementioned makes it possible to remove these disincentives.

Although any material may be used for the barrier layer without particular limitation as far as it develops the barrier property, the object can be usually attained by using transparent organic resin materials. Among these resin materials, non-solvent type ionizing radiation curing epoxy denatured acrylate resins, urethane denatured acrylate resins, acryl denatured polyester resins which have three or more functions, preferably 6 or more functions, and react with ionizing radiation such as ultraviolet rays and electron rays may be used. Among these resins, urethane denatured acrylate resins are particularly preferably used from the viewpoint of high barrier property.

Also, as these ionizing radiation curing resins, those having a molecular weight ranging from 500 to 2000 are preferably used in consideration of the coating aptitude thereof, the hardness of a finally obtained barrier layer and the like. Also, because the coating of the barrier layer is basically a non-solvent type, the barrier layer can be laminated and formed on any of the volume hologram layer, delaminating layer and heat sensitive adhesive layer.

Also, when the adhesion of each layer is low, an adhesion improving layer and the like may be formed.

Although the volume hologram transfer foil of the present invention as described above may be manufactured by laminating the above base material, volume hologram layer and heat sensitive adhesive layer one by one, it may be manufactured by preparing each member in an independent process, and laminating these members.

Examples of the manufacturing method include a method in which a volume hologram layer on which an image is recorded, a base material formed with a delaminating layer, and a heat sensitive adhesive layer are prepared and then laminated. When each member is prepared in an independent process, it is possible, for example, to form the delaminating layer and the like on the base material by a dry process, and this is therefore preferable from the viewpoint of the possibility of use of various materials and manufacturing efficiency.

Also, the volume hologram transfer foil may be those obtained by the following method: a volume hologram layer is formed on the above base material (a delaminating layer may be formed), and then a member, which is a volume hologram layer with an image recorded thereon, and a heat sensitive adhesive layer are prepared, and these are laminated. In this case, the following method, for example, may be adopted. Specifically, the aforementioned composition for forming the volume hologram layer is coated on a support and a radical polymerizable compound is polymerized by irradiating the composition with, for example, a laser to record an image, and laminated on the base material. Thereafter, the entire surface of the composition is irradiated to form a member on which the volume hologram layer with a recorded image and the base material are laminated. In succession, the support is delaminated and a heat sensitive adhesive is laminated under heating at, for example, 100° C. to 180° C.

Here, the volume hologram laminated body of the present invention as mentioned above maybe be applied to, for example, plastic cards, cellular phones, notes, daily necessities or packages of CD-ROMs.

Also, the present invention includes a method of controlling the layer adhesion between the base material and the volume hologram layer.

Specifically, in the case where the delaminating layer is provided in the layer structure of the volume hologram transfer foil, it is preferable that the relationship between the layer adhesion A between the delaminating layer and the support film, the layer adhesion B between the delaminating layer and the hologram forming layer, and the layer adhesion C between the volume hologram layer and the heat sensitive adhesive layer, and the value B satisfy the following formulae:

Layer adhesion: C≧B>A

B value: 600 gf/in.

The present invention is not limited to the aforementioned embodiments. These embodiments are examples and whatever has substantially the same structure and produces the same action effect as the technical idea described in the claim of the present invention is embraced by the technical scope of the present invention.

EXAMPLES

Hereinafter, the invention will be explained in detail by way of examples and comparative examples. All designations of "parts" and "%" in the examples are on a weight basis, unless otherwise noted.

[Methods for Measuring Breaking Strain and Breaking Strength]

The breaking strain and breaking strength of the volume hologram layer in the present invention are values measured as follows: a stress-strain curve (S-S curve) was automatically recorded from the values measured by using a tester "INSTRON5565" manufactured by INSTRON Company, according to JIS K7127-1989, to find the breaking strain from this curve.

Measuring atmosphere: 25° C. or 130° C.

Test piece: 25 mm width

Tensile rate: 2 mm/min.

[Production of Samples for Measuring Breaking Strength and Breaking Strain]

A photosensitive composition for recording a volume hologram was prepared with:

| | |
|---|---|
| Cationic polymerizable compound (described as "CM" in the tables) | 30 parts by weight |
| Radical polymerizable compound (described as "RM" in the tables) | 30 parts by weight |
| Sensitizer (described as "DYE" in the tables) | 1 part by weight |
| Active radical generating compound (described as "PI" in the tables) | 4 parts by weight |
| High molecular weight binder (described as "BP" in the tables) | 30 parts by weight |
| Fine particle | 5 parts by weight |

In this preparation, bis(4-acryloxydiethoxyphenyl)methane was used as the radical polymerizable compound and a combination of 3,9-diethyl-3'-carboxymethyl-2,2'-thiacarbocyanine.iodide and diphenyliodoniumhexafluoroantimonate was used as a photo-radical polymerization initiator system. Diphenyliodoniumhexafluoroantimonate was also used as a photo-cationic polymerization initiator system. A methylmethacrylate/glycidylmethacrylate copolymer (copolymerization ratio: 90/10, Mw: 50000) was used as a high molecular weight binder.

30 parts by weight of methyl ethyl ketone (MEK) and 30 parts by weight of methanol were added to 40 parts by weight of the above photosensitive composition for recording a volume hologram to obtain a solution of the photosensitive composition for recording a volume hologram. A PET film (Myler 200 manufactured by Du Pont) of 50 μm in film thickness was coated with the solution of the composition by gravure coating such that the film thickness after drying was 20 μm and further a PET film of 50 μm in thickness was laminated on the coated surface to produce a first member having a volume hologram forming layer.

After curing this film by a high pressure mercury lamp at an intensity of 4 J/cm$^2$, this film was delaminated from the support to produce a film test piece having a width of 25 mm and a length of 50 mm. If the surface of the support has been subjected to releasing treatment when forming a film, the cured hologram layer is easily delaminated.

[Production of a Sample for Evaluating Foil Cutting Property]

A first member (PET film/volume hologram forming layer/ (delaminatable) PET film) having a volume hologram forming layer, a second member (delaminating layer/PET film) having a delaminating layer, and a third member (heat sensitive adhesive layer/ delaminatable PET film) having a heat sensitive adhesive layer were prepared separately in each independent process.

[Production of the First Member]

30 parts by weight of methyl ethyl ketone (MEK) and 30 parts by weight of methanol were added to 40 parts by weight of the photosensitive composition for recording a volume hologram prepared in the above [Production of samples for measuring breaking strength and breaking strain] to obtain a solution of the photosensitive composition for recording a volume hologram. A PET film (Lumirror T60 (50 μm); manufactured by Toray Industries, Inc) of 50 μm in thickness was coated with the solution of the composition by gravure coating such that the film thickness after drying was 10 μm, and further a PET film (SP-PET (38 μm), manufactured by TOHCELLO, Co) which had been subjected to surface releasing treatment was laminated on the coated surface to produce a first member having a volume hologram forming layer.

[Production of a Second Member]

The second member was produced by coating a delaminating layer (Hakurinisu 45-3) evenly on a PET film (Lumirror T60 (50 μm); manufactured by Toray Industries, Inc.) by a known coating method such that the film thickness after drying was 1 μm.

[Production of a Third Member]

The third member was produced by coating a heat sensitive adhesive (EC1200; manufactured by CHUOURIKA. Co., Ltd.) on a PET film (SP-PET (50 μm), manufactured by TOHCELLO, Co) which had been subjected to surface releasing treatment by utilizing a known coating method such that the layer thickness after drying was 2 μm.

[Production of a Sample for Evaluation]

One PET film of the above first member having a volume hologram forming layer was delaminated, and the first member was laminated on a volume hologram master plate which had been prepared in advance. Then, the first member was exposed to argon laser light having a wavelength of 514 nm at an intensity of 1 mW/cm$^2$ for 60 seconds to form an interference fringe. In succession, heat treatment was carried out at 100° C. for 10 minutes to delaminate the PET film with surface releasing treatment processed on one surface of the first member, and the delaminating layer surface of the second member was laminated at 80° C. such that it faced the surface of the volume hologram forming layer. A laminated body consisting of a PET film/delaminating layer/volume hologram forming layer/PET film was obtained by this process. After that, the volume hologram forming layer was irradiated with a high pressure mercury lamp at an intensity of 2500 mJ/cm$^2$ to carry out fixing treatment (post-exposure), the PET film which is in contact with the sensitive material was delaminated and the heat sensitive adhesive layer surface of the third member was laminated on the delaminated surface at 100° C. The PET film with surface releasing treatment processed was delaminated from the laminated body consisting of the PET film/delaminating layer/volume hologram layer/ heat sensitive adhesive layer/surface releasing treated PET film, thereby obtaining a volume hologram transfer foil of the present invention.

A non-colored transparent volume hologram transfer foil was obtained which covers the range of practical use sufficiently in all of the examples and comparative examples shown below.

[Test Method for Transferring the Volume Hologram Transfer Foil]

A volume hologram transfer foil consisting of a PET film/ delaminating layer/volume hologram layer/heat sensitive adhesive layer was produced. The transfer foil of the volume hologram of the present invention was laminated on the surface of an adherend (vinyl chloride card), to which the volume hologram is to be transferred, such that the heat sensitive adhesive layer of the transfer foil was in contact with the adherend, and a 10 mm×10 mm rectangular metal mold was pressed, at 150° C., onto the portion of the transfer foil of which the volume hologram is to be transferred. A desired portion of the heat sensitive adhesive layer was melted and adhered to provide a transfer layer.

The evaluation of the foil cutting property was made by confirming whether or not an excess transfer foil was stuck to the outer periphery of the transferred part. The standard of evaluation was as follows: the case where the transferred portion was clearly broken from the non-transferred portion was defined as "◯", and the case where the both were clearly broken from each other, particularly, in a well reproducible manner was defined as "◎". Also, the case where the non-transferred portion was stuck slightly to one or two sides among the four sides of the transferred portion was defined as "Δ", and the case where large non-transferred portions were stuck to two or more sides was defined as "×". The "non-transferred portion" so-called here means a portion which sticking is not desired when the volume hologram is adhered from the volume hologram transfer foil.

Examples 1 to 16 and Comparative Examples 1 to 8

The combinations of the type of cationic polymerizable compound and the particle diameter of the fluorine type particle (FM108 polymer) were altered to evaluate the breaking strength, breaking strain and transfer aptitude of the volume hologram layer. Each condition and result of these volume hologram layers are shown in the following Table 1. In all of the examples, a volume hologram transfer foil which sufficiently covers the range of practical use was obtained.

TABLE 1

| | Material composition | | | | | | 25° C. | | 130° C. | | Foil |
|---|---|---|---|---|---|---|---|---|---|---|---|
| | CM | RM | DYE | PI | BP | Fine particle | Mech. strength | Breaking strain | Mech. strength | Breaking strain | cutting prop. |
| Ex. 1 | A | X | Y | Z | α | a | 13.5 | 1.5 | 0.2 | 3.6 | ○ |
| Ex. 2 | B | X | Y | Z | α | a | 16.7 | 1.0 | 0.2 | 2.0 | ○ |
| Ex. 3 | C | X | Y | Z | α | a | 17.1 | 0.9 | 0.2 | 1.9 | ○ |
| Ex. 4 | D | X | Y | Z | α | a | 20.5 | 0.5 or less | 0.3 | 1.0 | ◎ |
| Ex. 5 | E | X | Y | Z | α | a | 22.4 | 0.5 or less | 0.4 | 0.9 | ◎ |
| Ex. 6 | F | X | Y | Z | α | a | 23.8 | 0.5 or less | 0.5 | 0.9 | ◎ |
| Ex. 7 | G | X | Y | Z | α | a | 25.3 | 0.5 or less | 0.6 | 0.8 | ◎ |
| Ex. 8 | H | X | Y | Z | α | a | 26.9 | 0.5 or less | 0.8 | 0.7 | ◎ |
| Ex. 9 | A | X | Y | Z | α | b | 10.4 | 2.9 | 0.1 | 4.8 | ○ |
| Ex. 10 | B | X | Y | Z | α | b | 12.8 | 1.9 | 0.1 | 2.7 | ○ |
| Ex. 11 | C | X | Y | Z | α | b | 13.1 | 1.7 | 0.1 | 2.5 | ○ |
| Ex. 12 | D | X | Y | Z | α | b | 15.7 | 1.0 | 0.1 | 1.4 | ◎ |
| Ex. 13 | E | X | Y | Z | α | b | 17.2 | 1.0 | 0.2 | 1.2 | ◎ |
| Ex. 14 | F | X | Y | Z | α | b | 18.2 | 0.9 | 0.3 | 1.2 | ◎ |
| Ex. 15 | G | X | Y | Z | α | b | 19.4 | 0.9 | 0.3 | 1.1 | ◎ |
| Ex. 16 | H | X | Y | Z | α | b | 20.6 | 0.8 | 0.4 | 0.9 | ◎ |
| Co Ex. 1 | A | X | Y | Z | α | c | 30.6 | 13.9 | 1.1 | 35.7 | x |
| Co Ex. 2 | B | X | Y | Z | α | c | 35.4 | 9.2 | 1.1 | 20.3 | x |
| Co Ex. 3 | C | X | Y | Z | α | c | 36.1 | 8.3 | 1.1 | 19.1 | x |
| Co Ex. 4 | D | X | Y | Z | α | c | 43.4 | 4.7 | 1.2 | 10.4 | Δ |
| Co Ex. 5 | E | X | Y | Z | α | c | 47.4 | 4.7 | 1.7 | 9.4 | Δ |
| Co Ex. 6 | F | X | Y | Z | α | c | 50.3 | 4.2 | 2.4 | 8.8 | Δ |
| Co Ex. 7 | G | X | Y | Z | α | c | 53.6 | 4.1 | 2.9 | 8.3 | Δ |
| Co Ex. 8 | H | X | Y | Z | α | c | 56.9 | 3.7 | 3.7 | 7.0 | Δ |

Examples 17 to 40 and Comparative Examples 9 to 16

The combinations of the type of cationic polymerizable compound and the particle diameter of the fluorine type particle (PTFE polymer) were altered to evaluate the breaking strength, breaking strain, and transfer aptitude of the volume hologram layer. Each condition and result of these volume hologram layers are shown in the following Table 2. In all of the examples, a volume hologram transfer foil which sufficiently covers the range of practical use was obtained.

TABLE 2

| | Material composition | | | | | | 25° C. | | 130° C. | | Foil |
|---|---|---|---|---|---|---|---|---|---|---|---|
| | CM | RM | DYE | PI | BP | Fine particle | Mech. strength | Breaking strain | Mech. strength | Breaking strain | cutting prop. |
| Ex. 17 | A | X | Y | Z | α | d | 14.8 | 1.2 | 0.2 | 2.8 | ○ |
| Ex. 18 | B | X | Y | Z | α | d | 18.3 | 0.8 | 0.3 | 1.6 | ○ |
| Ex. 19 | C | X | Y | Z | α | d | 18.7 | 0.7 | 0.3 | 1.5 | ○ |
| Ex. 20 | D | X | Y | Z | α | d | 22.4 | 0.5 or less | 0.3 | 0.8 | ◎ |
| Ex. 21 | E | X | Y | Z | α | d | 24.5 | 0.5 or less | 0.4 | 0.7 | ◎ |
| Ex. 22 | F | X | Y | Z | α | d | 26.0 | 0.5 or less | 0.6 | 0.7 | ◎ |
| Ex. 23 | G | X | Y | Z | α | d | 27.7 | 0.5 or less | 0.7 | 0.6 | ◎ |
| Ex. 24 | H | X | Y | Z | α | d | 29.4 | 0.5 or less | 0.9 | 0.5 or less | ◎ |
| Ex. 25 | A | X | Y | Z | α | e | 11.0 | 2.6 | 0.1 | 4.4 | ○ |
| Ex. 26 | B | X | Y | Z | α | e | 13.6 | 1.7 | 0.1 | 2.5 | ○ |
| Ex. 27 | C | X | Y | Z | α | e | 13.9 | 1.6 | 0.1 | 2.3 | ○ |
| Ex. 28 | D | X | Y | Z | α | e | 16.7 | 0.9 | 0.2 | 1.3 | ◎ |
| Ex. 29 | E | X | Y | Z | α | e | 18.2 | 0.9 | 0.2 | 1.1 | ◎ |
| Ex. 30 | F | X | Y | Z | α | e | 19.4 | 0.8 | 0.3 | 1.1 | ◎ |
| Ex. 31 | G | X | Y | Z | α | e | 20.6 | 0.8 | 0.4 | 1.0 | ◎ |
| Ex. 32 | H | X | Y | Z | α | e | 21.9 | 0.7 | 0.5 | 0.9 | ◎ |
| Ex. 33 | A | X | Y | Z | α | g | 14.8 | 3.4 | 0.3 | 7.5 | Δ |
| Ex. 34 | B | X | Y | Z | α | g | 18.3 | 2.2 | 0.3 | 4.3 | ○ |
| Ex. 35 | C | X | Y | Z | α | g | 19.4 | 2.0 | 0.3 | 3.5 | ○ |
| Ex. 36 | D | X | Y | Z | α | g | 22.4 | 1.1 | 0.4 | 2.2 | ○ |
| Ex. 37 | E | X | Y | Z | α | g | 24.5 | 1.1 | 0.5 | 2.0 | ○ |
| Ex. 38 | F | X | Y | Z | α | g | 26.0 | 1.0 | 0.7 | 1.9 | ○ |
| Ex. 39 | G | X | Y | Z | α | g | 27.7 | 1.0 | 0.8 | 1.7 | ○ |
| Ex. 40 | H | X | Y | Z | α | g | 29.4 | 0.9 | 1.0 | 1.5 | ○ |
| Co. Ex. 9 | A | X | Y | Z | α | f | 31.3 | 12.0 | 1.1 | 31.8 | x |
| Co. Ex. 10 | B | X | Y | Z | α | f | 33.8 | 8.0 | 1.2 | 18.1 | x |
| Co. Ex. 11 | C | X | Y | Z | α | f | 34.5 | 7.2 | 1.1 | 17.0 | x |
| Co. Ex. 12 | D | X | Y | Z | α | f | 41.5 | 4.1 | 1.1 | 9.2 | Δ |
| Co. Ex. 13 | E | X | Y | Z | α | f | 45.3 | 4.1 | 1.6 | 8.3 | Δ |
| Co. Ex. 14 | F | X | Y | Z | α | f | 48.1 | 3.7 | 2.2 | 7.8 | Δ |

TABLE 2-continued

| | Material composition | | | | | 25° C. | | 130° C. | | Foil |
| | CM | RM | DYE | PI | BP | Fine particle | Mech. strength | Breaking strain | Mech. strength | Breaking strain | cutting prop. |
|---|---|---|---|---|---|---|---|---|---|---|---|
| Co. Ex. 15 | G | X | Y | Z | α | f | 51.2 | 3.6 | 2.6 | 7.4 | Δ |
| Co. Ex. 16 | H | X | Y | Z | α | f | 54.4 | 3.2 | 3.4 | 6.2 | Δ |

Comparative Examples 17 to 24

Next, no particle was compounded and the type of cationic polymerizable compound was altered to evaluate the breaking strength, breaking strain, and transfer aptitude of the volume hologram layer. Each condition and result of these volume hologram layers are shown in the following Table 3. In any of these comparative examples, a volume hologram transfer foil which sufficiently covers the range of practical use was not obtained.

Comparative Examples 27 and 28

Next, the breaking strength, breaking strain, and transfer aptitude of volume hologram layers using Omnidex 352 as a volume hologram recording material and comprising each particle according to the formulations described in Examples 1 and 2 of the Japanese Patent Application No. 10-97173 were evaluated. Each condition and result of these volume hologram layers are shown in the following Table 5. In any of these comparative examples, a volume hologram transfer foil which sufficiently covers the range of practical use was not obtained.

TABLE 3

| | Material composition | | | | | 25° C. | | 130° C. | | Foil |
| | CM | RM | DYE | PI | BP | Fine particle | Mech. strength | Breaking strain | Mech. strength | Breaking strain | cutting property |
|---|---|---|---|---|---|---|---|---|---|---|---|
| Co. Ex. 17 | A | X | Y | Z | α | None | 31.4 | 15.4 | 1.1 | 39.7 | x |
| Co. Ex. 18 | B | X | Y | Z | α | None | 38.9 | 10.2 | 1.2 | 22.6 | x |
| Co. Ex. 19 | C | X | Y | Z | α | None | 39.7 | 9.2 | 1.2 | 21.2 | x |
| Co. Ex. 20 | D | X | Y | Z | α | None | 47.7 | 5.2 | 1.4 | 11.5 | Δ |
| Co. Ex. 21 | E | X | Y | Z | α | None | 52.1 | 5.2 | 2.0 | 10.4 | Δ |
| Co. Ex. 22 | F | X | Y | Z | α | None | 55.3 | 4.7 | 2.8 | 9.8 | Δ |
| Co. Ex. 23 | G | X | Y | Z | α | None | 58.9 | 4.6 | 3.3 | 9.2 | Δ |
| Co. Ex. 24 | H | X | Y | Z | α | None | 62.6 | 4.1 | 4.3 | 7.8 | Δ |

Comparative Examples 25 and 26

Next, Omnidex 352 was used as a volume hologram recording material and fluorine type particles (FM108 polymer: 200 nm, PTFE particle: 200 nm) were added according to the formulations described in Example 1 of Japanese Patent Application No.10-97173 to evaluate the breaking strength, breaking strain, and transfer aptitude of the volume hologram layer. Each condition and result of these volume hologram layers are shown in the following Table 4. In any of these comparative examples, a volume hologram transfer foil which sufficiently covers the range of practical use was not obtained.

TABLE 4

| | Material composition | | 25° C. | | 130° C. | | Foil |
| | Recording material | Fine particle | Mech. strength | Breaking strain | Mech. strength | Breaking strain | cutting prop. |
|---|---|---|---|---|---|---|---|
| Co. Ex. 25 | Ominidex 352 | a | 32.4 | 17.2 | 1.3 | 45.8 | x |
| Co. Ex. 26 | Ominidex 352 | d | 31.3 | 18.3 | 1.3 | 51.4 | x |

TABLE 5

|  | Material composition Recording material | 25° C. Mech. strength | 25° C. Breaking strain | 130° C. Mech. strength | 130° C. Breaking strain | Foil cutting prop. |
|---|---|---|---|---|---|---|
| Co. Ex. 27 | Ominidex 352 + glass beads (4 μm) | 32.3 | 5.2 | 1.5 | 9.7 | Δ |
| Co. Ex. 28 | Ominidex 352 + reactive micro gel (50 nm) | 30.7 | 6.5 | 1.5 | 12.9 | Δ |

Comparative Examples 29 to 36

Next, colloidal silica (MIBK-ST (manufactured by Nissan Chemical Industries, Ltd.)) was used as the particle and the type of cationic polymerizable compound was altered to evaluate the breaking strength, breaking strain, and transfer aptitude of the volume hologram layer. Each condition and result of these volume hologram layers are shown in the following Table 6. In any of these comparative examples, a volume hologram transfer foil which sufficiently covers the range of practical use was not obtained.

TABLE 6

|  | Material composition | | | | | | 25° C. | | 130° C. | | Foil |
|---|---|---|---|---|---|---|---|---|---|---|---|
|  | CM | RM | DYE | PI | BP | Fine particle | Mech. strength | Breaking strain | Mech. strength | Breaking strain | cutting prop. |
| Co. Ex. 29 | A | X | Y | Z | α | h | 34.5 | 14.2 | 1.2 | 35.3 | x |
| Co. Ex. 30 | B | X | Y | Z | α | h | 42.8 | 9.4 | 1.3 | 20.1 | x |
| Co. Ex. 31 | C | X | Y | Z | α | h | 43.7 | 8.5 | 1.3 | 18.9 | x |
| Co. Ex. 32 | D | X | Y | Z | α | h | 52.5 | 4.8 | 1.5 | 10.2 | Δ |
| Co. Ex. 33 | E | X | Y | Z | α | h | 57.3 | 4.8 | 2.2 | 9.3 | Δ |
| Co. Ex. 34 | F | X | Y | Z | α | h | 60.8 | 4.3 | 3.0 | 8.7 | Δ |
| Co. Ex. 35 | G | X | Y | Z | α | h | 64.8 | 4.2 | 3.6 | 8.2 | Δ |
| Co. Ex. 36 | H | X | Y | Z | α | h | 68.8 | 3.8 | 4.6 | 6.9 | Δ |

Examples 41 and 42

Next, a titania fine particle (R-630 (manufactured by Ishihara Sangyo Co., Ltd.)) was used as the particle and the type of cationic polymerizable compound was altered to evaluate the breaking strength, breaking strain, and transfer aptitude of the volume hologram layer. Each condition and result of these volume hologram layers are shown in the following Table 7. In both of these comparative examples, a volume hologram transfer foil which sufficiently covers the range of practical use was obtained.

TABLE 7

|  | Material composition | | | | | | 25° C. | | 130° C. | | Foil |
|---|---|---|---|---|---|---|---|---|---|---|---|
|  | CM | RM | DYE | PI | BP | Fine particle | Mech. strength | Breaking strain | Mech. strength | Breaking strain | cutting prop. |
| Ex. 41 | A | X | Y | Z | α | i | 13.7 | 2.1 | 0.2 | 1.3 | ○ |
| Ex. 42 | B | X | Y | Z | α | i | 11.8 | 2.4 | 0.2 | 1.1 | ○ |

The cationic polymerizable compounds "CM" used in the examples and comparative examples shown in Tables 1 to 7 are shown in Table 8.

TABLE 8

| CM | | Number of functions | Refractive index |
|---|---|---|---|
| A | Denacol EX-121 (manufactured by Nagase chemtex corporation) | 1 function | 1.45 |
| B | Denacol EX-212 (manufactured by Nagase chemtex corporation) | 2 functions | 1.46 |

TABLE 8-continued

| CM | | Number of functions | Refractive index |
|---|---|---|---|
| C | URV-6110 (manufactured by Union Carbide) | 2 functions | 1.49 |
| D | Epolead GT-300 (manufactured by Daicel Chemical Industries, Ltd.) | 3 functions | 1.50 |
| E | Denacol EX-314 (manufactured by Nagase chemtex corporation) | 3 functions | 1.49 |

TABLE 8-continued

| CM | | Number of functions | Refractive index |
|---|---|---|---|
| F | Epolead GT-400 (manufactured by Daicel Chemical Industries, Ltd.) | 4 functions | 1.51 |
| G | Denacol EX-411 (manufactured by Nagase chemtex corporation) | 4 functions | 1.49 |
| H | Denacol EX-521 (manufactured by Nagase chemtex corporation) | 6 functions | 1.51 |

Also, the refractive index of the radical polymerizable compound used above is 1.54 and is larger than that of the above cationic polymerizable compound. It is to be noted that each value of the refractive index was measured by using an Abbe's refractometer according to JIS K4172.

Further, the fine particles used in examples and comparative examples shown in Tables 1 to 7 are shown in Table 9.

TABLE 9

| | Fine particles | Ave. particle dia.. |
|---|---|---|
| a | Polymer FM108 manufactured by Kyoeisha Chemical Co., Ltd. | 200 nm |
| b | Polymer FM108 manufactured by Kyoeisha Chemical Co., Ltd. | 500 nm |
| c | Polymer FM108 manufactured by Kyoeisha Chemical Co., Ltd. | 1 μm |
| d | PTFE particle | 200 nm |
| e | PTFE particle | 500 nm |
| f | PTFE particle | 1 μm |
| g | Methylmethacrylate polymer | 200 nm |
| h | Colloidal silica MIBK-ST (manufactured by Nissan Chemical Ind., Ltd.) | 20 nm |
| i | Titania R-630 (manufactured by Ishihara Sangyo Co., Ltd.) | 240 nm |

What is claimed is:

1. A volume hologram transfer foil comprising a base material, a volume hologram layer formed on the base material, and a heat sensitive adhesive layer formed on the volume hologram layer, wherein for the volume hologram layer with thickness of 20 μm, breaking strength is in a range from 10 MPa to 30 MPa and breaking strain is in a range from 0.1% to 3% at 25° C., and breaking strength is in a range from 0.1 MPa to 1 Mpa and breaking strain is in a range from 0.1% to 5% at 130° C., wherein the volume hologram layer comprises a fluorine type fine particle, and further wherein the fluorine type fine particle has a particle diameter of 100 nm to 600 nm.

2. The volume hologram transfer foil according to claim 1, wherein content of the fine particle in the volume hologram layer is within the range of 1% by weight to 30% by weight.

* * * * *